United States Patent [19]
Conner, Jr.

[11] 3,962,392
[45] June 8, 1976

[54] METHODS OF MOLDING MOLDABLE TEXTILE FABRICS
[75] Inventor: William R. Conner, Jr., Shelbyville, Tenn.
[73] Assignee: Stahl-Urban Company, Brookhaven, Miss.
[22] Filed: Nov. 15, 1974
[21] Appl. No.: 524,134

[52] U.S. Cl. .................................... 264/89; 264/92; 264/237; 264/316; 425/388
[51] Int. Cl.² .................... B29C 17/04; B29C 25/00
[58] Field of Search .................. 264/37, 89, 90, 92, 264/93, 94, 237, 320, 322, 292, 316; 425/388

[56] References Cited
FOREIGN PATENTS OR APPLICATIONS
899,646  6/1962  United Kingdom .................. 264/92
988,370  4/1965  United Kingdom .................. 264/92

OTHER PUBLICATIONS
F. C. Flindt & J. P. Dougherty, "Molding of Knitted Fabrics," *Knitted Outerwear Times*, 6-1970, pp. 53–59.

Primary Examiner—Jan H. Silbaugh
Attorney, Agent, or Firm—Koenig, Senniger, Powers and Leavitt

[57] ABSTRACT

Molding thermoformable textile fabric (knit, woven or otherwise), and particularly stretch fabric, into a permanent three-dimensional shape by vacuum-molding in a cavity in a vacuum mold, wherein flow of air through the fabric is blocked to enable it to be vacuum-formed by means of a layer of substantially air-impervious thermoformable sheet plastic material applied over the fabric. The plastic is heated to thermoforming temperature, the plastic and fabric are vacuum-formed in the mold, the molded plastic layer with the molded fabric thereon being removed from the mold and the molded plastic layer being utilized as a form for holding the molded fabric in its molded shape for a sufficient period of time to stabilize the fabric in its molded shape. The molded plastic layer is cooled within the mold via a flow of cooling air.

3 Claims, 13 Drawing Figures

METHODS OF MOLDING MOLDABLE TEXTILE FABRICS

BACKGROUND OF THE INVENTION

This invention relates to methods of molding moldable textile fabrics, and more particularly to such methods for molding stretch fabric into components of articles of apparel such as girdles.

The invention is especially concerned with molding items as above described of stretch fabrics such as nylon and polyester fabrics and spandex and, in general, is applicable to molding items of any textile fabric (knit, woven or otherwise) comprising synthetic fibers making it capable of being molded.

Reference may be made to the article entitled *Molding of Knitted Fabrics* appearing in the June 8, 1970 issue of Knitted Outerwear Times for a discussion of various prior techniques for molding fabrics into permanent three-dimensional shapes including cavity molding, drape molding, plug-assist molding and matched mold molding. The present invention comes within the category of cavity molding (also referred to as straight vacuum-forming in said article). Prior cavity molding techniques (or straight vacuum-forming techniques) have not been successful for molding stretch fabrics into permanent three-dimensional shapes.

SUMMARY OF THE INVENTION

Among the several objects of this invention may be noted the provision of an improved method of cavity molding or straight vacuum-forming of thermoformable textile fabric into a permanent three-dimensional shape, particularly for molding thermoformable stretch fabrics such as spandex fabrics and nylon and polyester twist; and the provision of such a method adapted for rapid and efficient cavity molding of such fabrics.

In general, the method of this invention for forming thermoformable textile fabric into a permanent three-dimensional shape comprises applying a layer of substantially air-impervious thermoformable sheet plastic material to one face of the fabric, applying the fabric with the plastic layer thereon to a mold having a cavity conforming to the three-dimensional shape desired with the fabric toward the cavity, the plastic layer being heated to thermoforming temperature, applying a vacuum to the cavity to draw the plastic layer and the fabric into the cavity thereby to mold the fabric and also said plastic layer to the shape of the cavity, releasing the vacuum and removing the molded plastic layer with the molded fabric thereon from the mold.

Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF THE PREFERRED EMBODIMENTS

Figure 1:
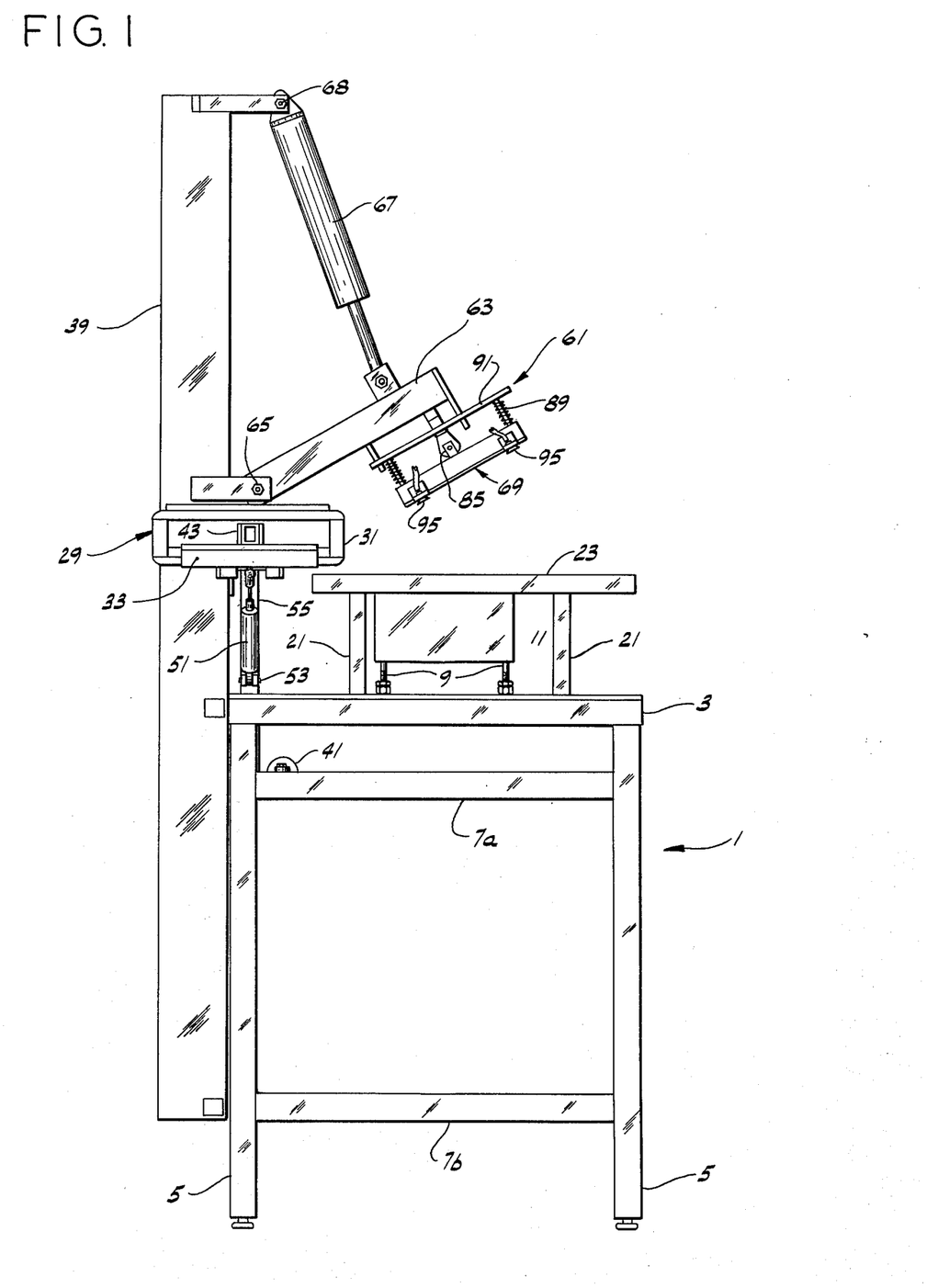
FIG. 1 is a side elevation of apparatus for carrying out this invention, with parts broken away.
Figure 2:
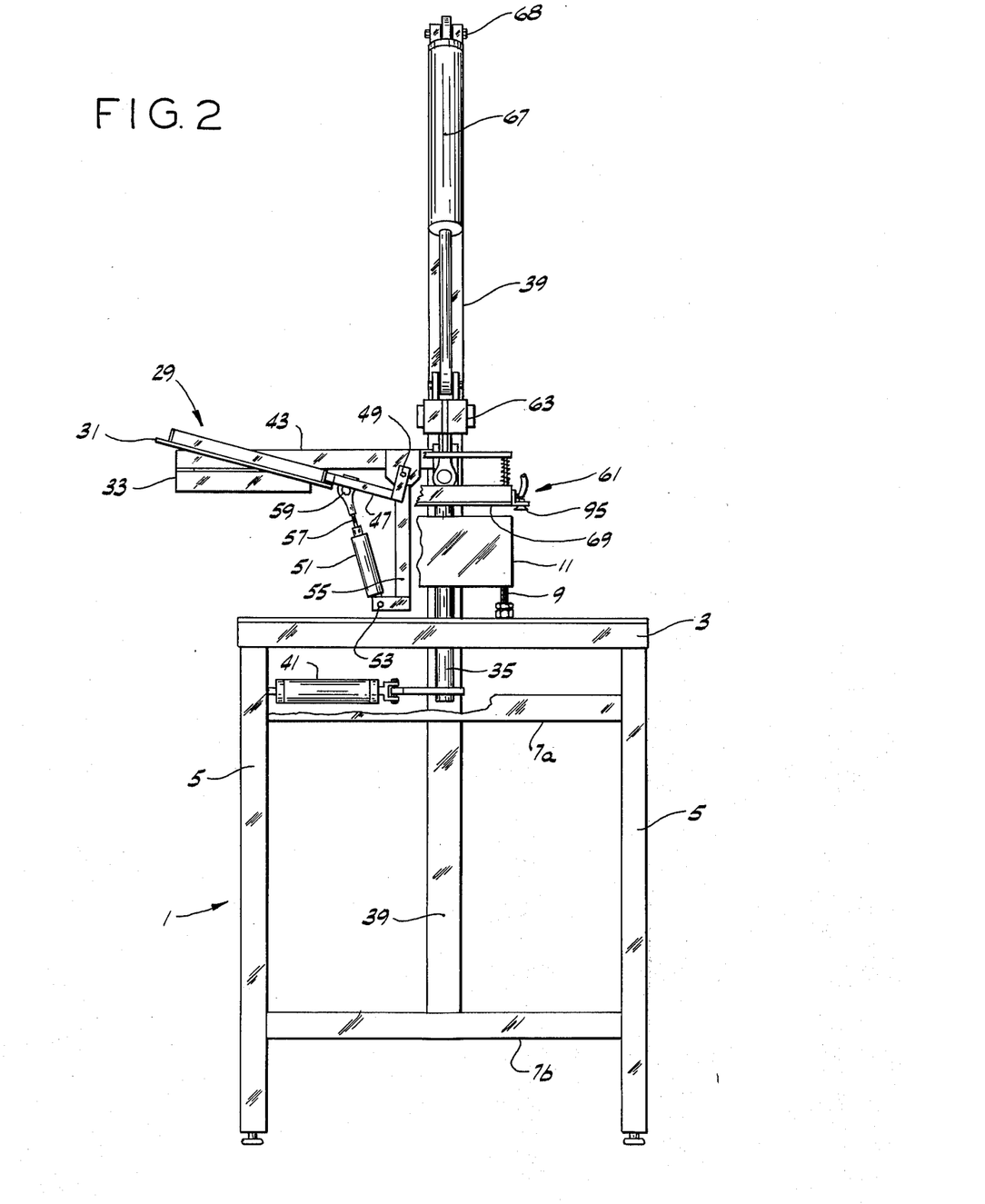
FIG. 2 is a front elevation of FIG. 1 with parts broken away.
Figure 10:
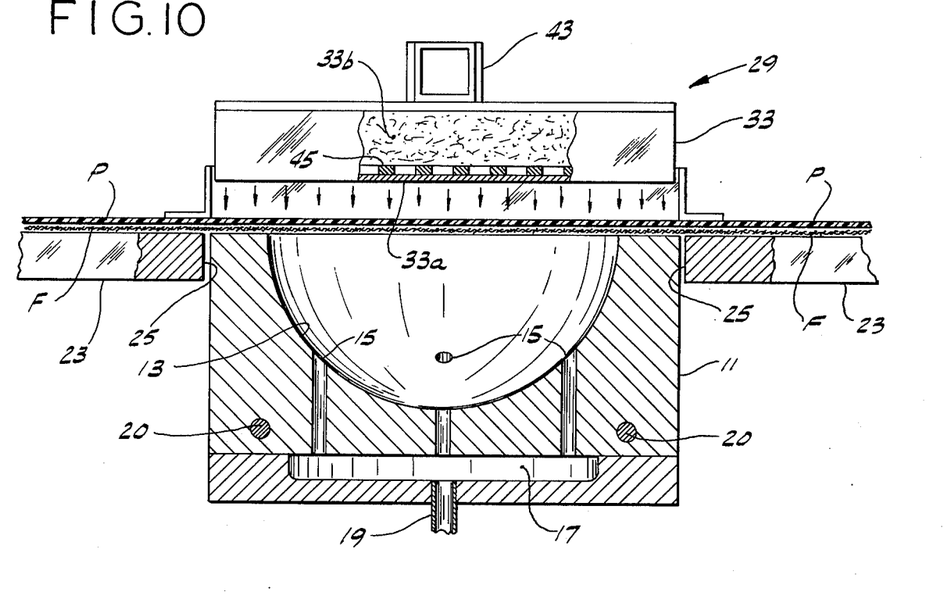
FIG. 10 is an enlarged section on line 10—10 of FIG. 6.
Figure 11:
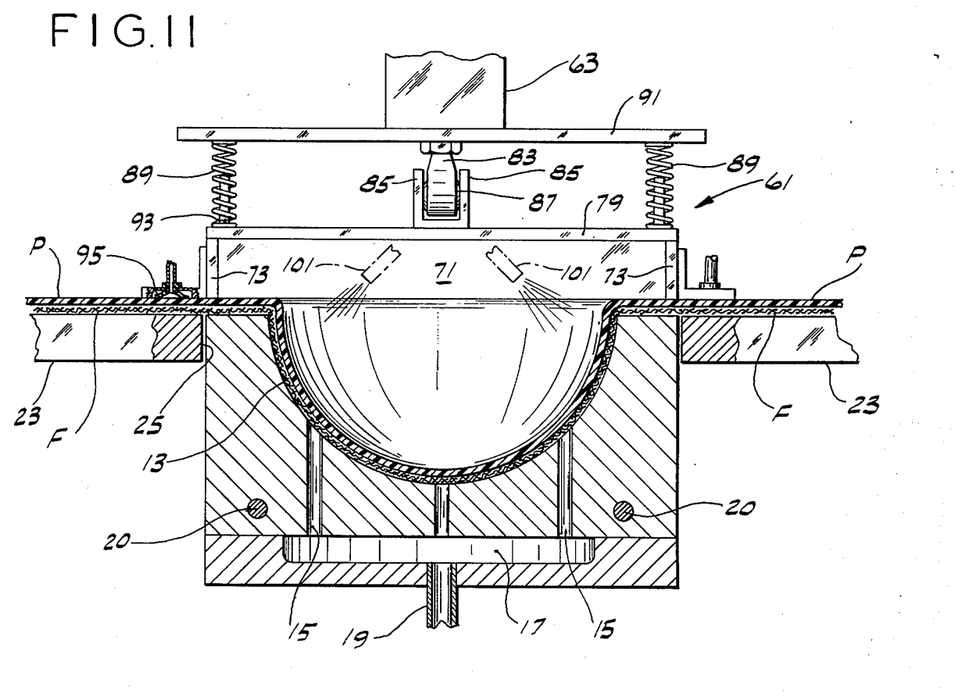
FIG. 11 is an enlarged section on line 11—11 of FIG. 7 showing the fabric and plastic layer molded in the mold cavity.

Referring to the drawings, first more particularly to FIGS. 1 and 2, there is indicated at 1 a table structure comprising a top 3 on legs 5, with suitable bracing as indicated at 7a and 7b. Extending up from the top 3 are adjustable legs 9 supporting a vacuum mold 11 having a mold cavity 13 therein conforming to the three-dimensional shape desired for the fabric to be molded. For simplification of the disclosure, the cavity is illustrated as of approximately hemispherical shape; it will be understood that this is simply representative of a wide variety of three-dimensional shapes that may be molded. The mold 11 is basically a block of rectangular outline in plan (it may be of square outline). Cavity 13 is formed in the top of the block. Vacuum passages such as indicated at 15 (see FIGS. 10 and 11) extend down through the block to a vacuum manifold 17 at the bottom of the block. The latter is connected via a vacuum port 19 to a suitable vacuum source (e.g., an air pump for pulling a vacuum in the manifold) under suitable conventional valve control (not shown). This provides means for drawing a vacuum in the cavity 13. The mold may be heated by means of cartridge heaters therein such as indicated at 20.

Figure 3:
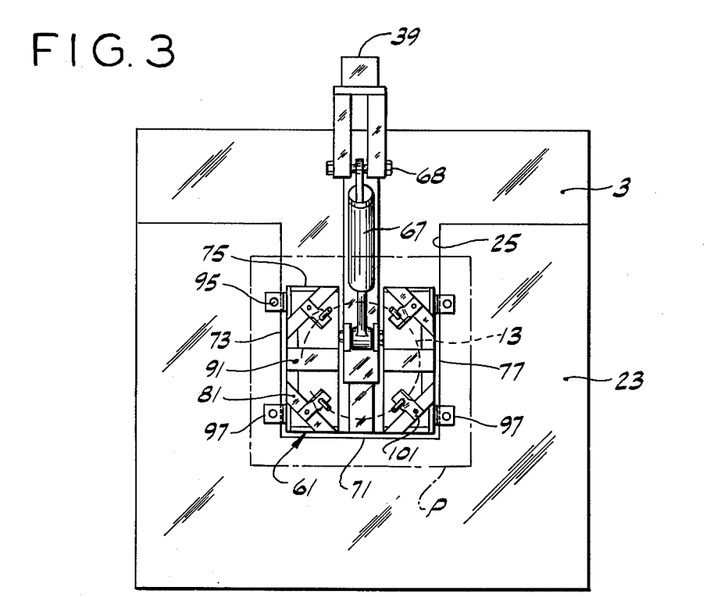
FIG. 3 is a plan of FIG. 1 with a clamping and heating assembly omitted.

Also extending up from the table top 3 are legs 21 supporting a rectangular platform 23 having a rectangular cutout 25 (see FIG. 3) in one side 27, which may be referred to as its rear side, for the upper end of the mold 11. The mold is adjusted vertically via the adjustable legs 9 so that its top is generally flush with the top surface of the platform 23, the upper end of the mold fitting in the cutout 25. The arrangement is such that a piece of fabric F to be molded and a layer of substantially air-impervious thermoformable sheet plastic material P may be placed on the platform 23 over the top of the mold, means indicated generally at 29 being provided for clamping the fabric F and sheet of plastic P down on top of the platform around the cutout 25 and heating them in preparation for the molding operation.

The clamping and heating means 29 comprises an assembly of a clamping frame 31 for holding down the fabric F and plastic sheet P and a heater 33 for heating the sheet. The frame 31 and heater 33 are carried by a vertical shaft 35 for swinging movement about the vertical axis of the shaft between a retracted position off to the left side and rearward of the mold as shown in solid lines in FIG. 4 and an operative position above the mold as shown in phantom in FIG. 4. The shaft 35 is journalled in bearings such as indicated at 37 on a post 39 at the rear of the table 1 extending up from the table, and is rotatable by means of an air cylinder 41 located below the table top 3 for swinging the clamp frame and heater assembly 29 between its stated positions. The heater 33 comprises a rectangular plate 33a backed by asbestos 33b carried by an arm 43 extending horizontally from the upper end of the shaft 35. An electrical resistance heating element such as indicated at 45 is provided on the plate for heating it. In the operative position of the clamping and heating means, the heater 33 directly overlies the cutout 25 (and the mold 11) and hence is in position for heating by radiation the fabric F and sheet of plastic P placed on the platform 23 (see FIG. 10).

Figure 5:
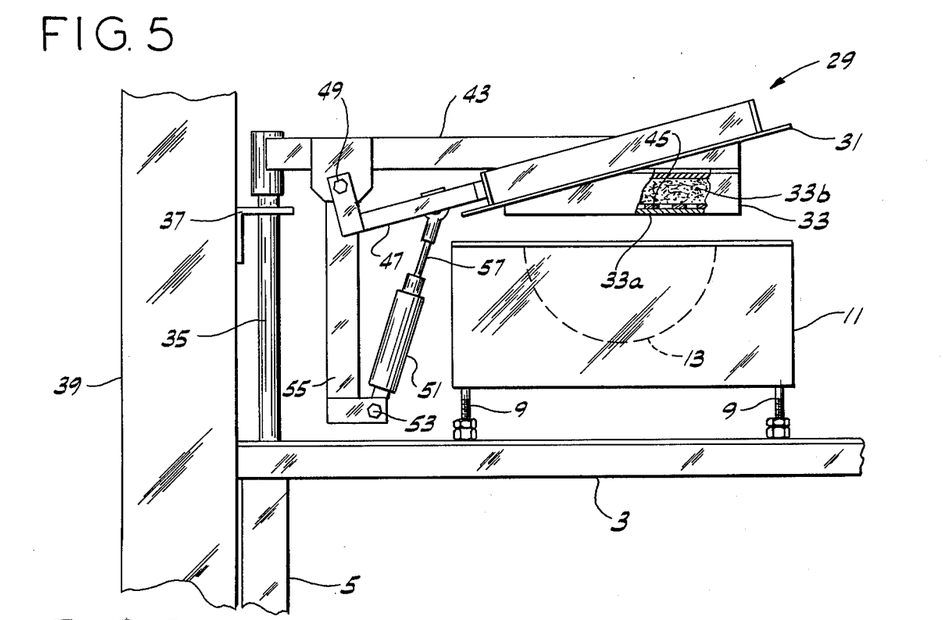
FIG. 5 is a fragmentary side elevation showing the clamping and heating assembly over the mold of the apparatus with a clamping frame of this assembly raised.
Figure 6:
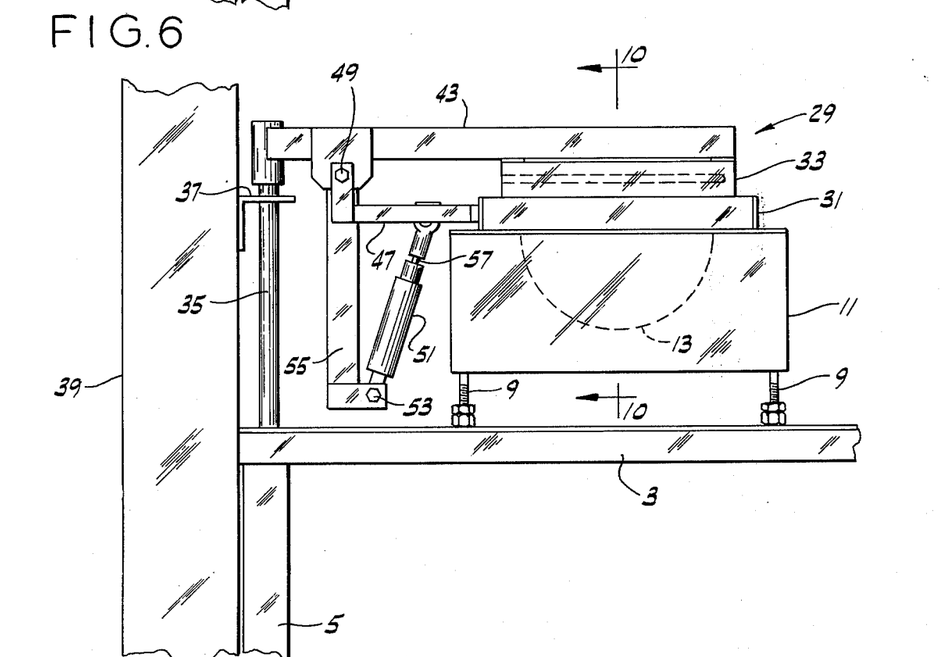
FIG. 6 is a view similar to FIG. 5 showing the clamping frame of the clamping and heating assembly down.

The clamping frame 31 is an open rectangular frame (a four-sided open frame) larger than the heater 33 surrounding the heater. It is carried by an arm 47 pivoted at 49 on the arm 43 for swinging movement about a horizontal axis between the raised retracted position in which it is shown in FIGS. 2 and 5 and the lowered clamping position in which it is shown in FIG. 6 for clamping the fabric F and plastic sheet P down against the top of the platform 23 at the front and both sides of the cutout 25. The clamping frame 31 is swingable up and down between its stated positions by means of an air cylinder 51 which has its lower end pinned at 53 to a leg 55 extending down from the arm 43 and its piston rod 57 pinned at 59 to the arm 47.

After the fabric F and plastic sheet P on top of the mold 11 have been heated by the heater 33, the clamping frame 31 is raised, and the entire clamping and heating means 29 is swung off to its retracted position clear of the top of the mold. Then, a clamping head 61 is lowered to clamp the fabric and plastic sheet down on top of the mold 11 for the molding operation. Head 61 is carried by an arm 63 pivoted at 65 on the post 39 for swinging movement on a horizontal axis extending transversely of the table. The arm is operable by an air cylinder 67 pinned at its upper end on the post as indicated at 68 to raise the head to the retracted position shown in FIG. 1 and in phantom in FIG. 7 spaced from the mold, and to lower the head to its clamping position shown in solid lines in FIG. 7 and in FIG. 11 wherein it clamps the plastic sheet and fabric down against the top of the mold.

The clamping head 61 comprises an open rectangular box frame 69 (see particularly FIG. 8), formed of four flat metal bars 71, 73, 75 and 77 welded together at their ends. A flat metal bar 79 centrally bridges the two opposite sides 71 and 75 of the box frame at its top. Four angled corner bars each designated 81 are provided at the top of the box frame, one adjacent each of the four corners of the frame. The frame is mounted for universal rocking movement on the lower end of a stud 83 extending down from the arm 63 adjacent its free (outer) end. The stud extends between a pair of lugs 85 on the bridge 79 of the box frame, and has a ball joint connection as indicated at 87 with these lugs enabling the frame to rock at least to some extent in any direction. The frame is held in a generally centered or leveled position by means of a plurality of centering springs 89 (four such springs being shown) reacting from a cruciform spring back-up member 91 mounted on the stud 83 against the frame, the latter having pins 93 for centering the springs.

Figure 8:
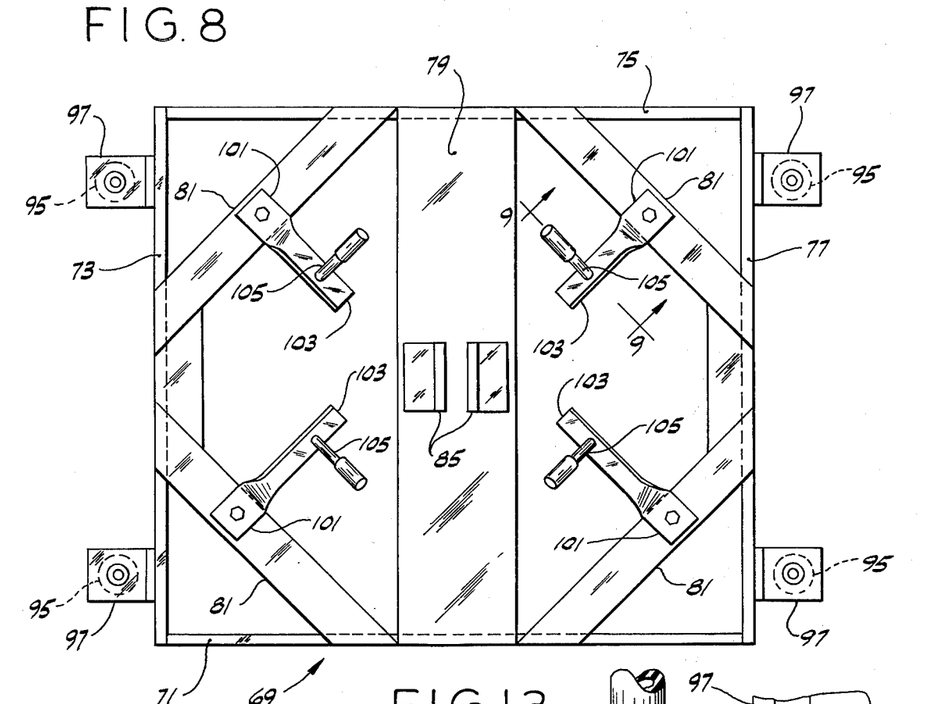
FIG. 8 is a plan of the clamping head.
Figures 9, 13:
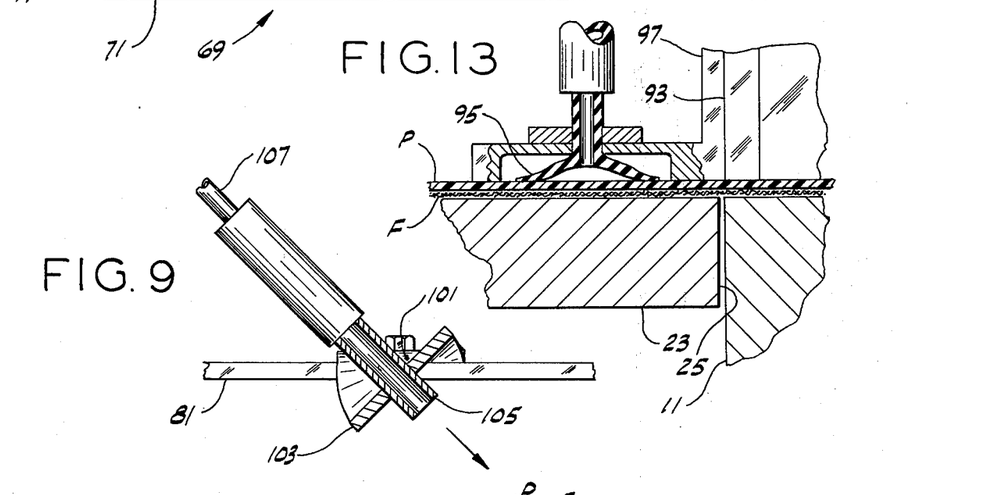
FIG. 9 is an enlarged section on line 9—9 of FIG. 8.
FIG. 13 is an enlarged section on line 13—13 of FIG. 7.

A pair of suction cups 95 is mounted on each of the two opposite sides 73 and 77 of the box frame by means of an angle bracket 97. Each of these cups is connected by a flexible hose 99 to a source of vacuum, and is engageable with sheet P, F overlying the platform 23. Extending inwardly from each of the angled corner bars 81 at right angles thereto is a bracket 101 constituted by a flat metal bar having its free end 103 twisted to be at an angle as shown in FIG. 8 and carrying an air jet 105 to which is connected a flexible hose 107 for supplying air to the jet.

Figure 4:
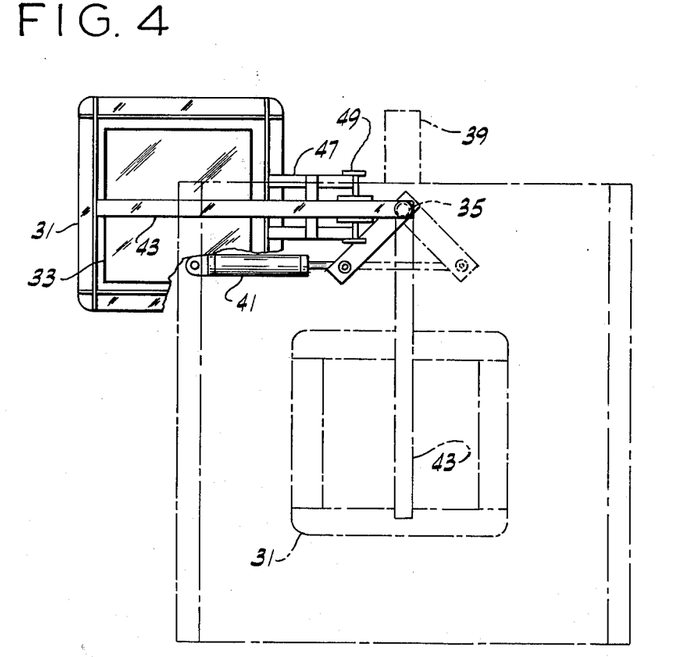
FIG. 4 is a plan showing the clamping and heating assembly.
Figure 7:
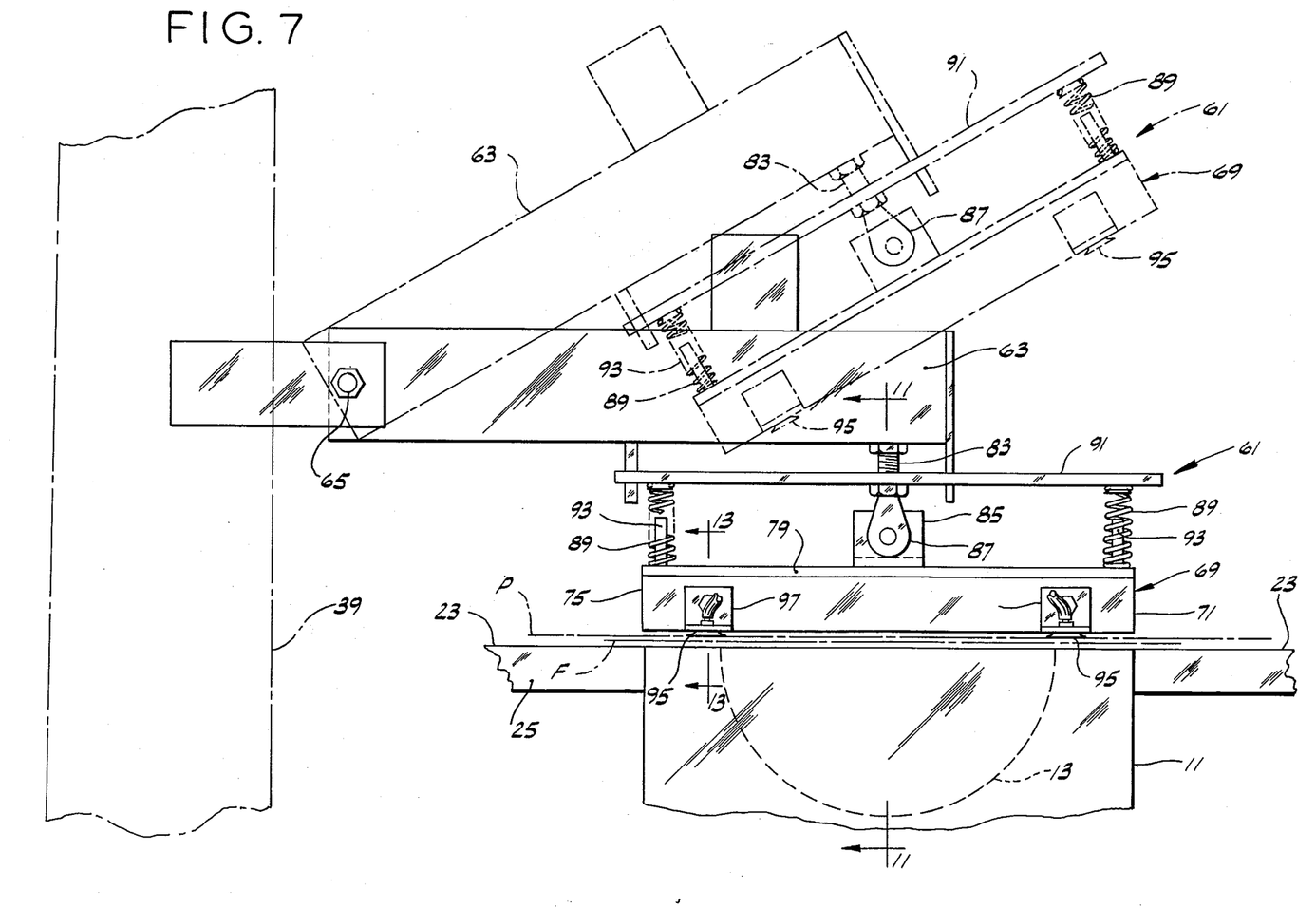
FIG. 7 is a fragmentary side elevation showing a clamping head of the apparatus.

In operation, with the clamping head 61 in its raised retracted position shown in FIG. 1 and in phantom in FIG. 7, and with the clamp and heater assembly 29 swung off to its retracted position shown in FIGS. 1 and 4, a layer of synthetic thermoformable textile fabric F (e.g., spandex) and a layer of substantially air-impervious thermoformable sheet plastic material P (e.g., a sheet of butyrate or propionate plastic) are applied to the mold 11 by laying them on the platform 23 extending over the top of the mold with the fabric toward the cavity 13 and with the layer of sheet plastic material overlying the fabric. The fabric and plastic sheet are large enough to extend beyond the mold on all four sides thereof and overlie the platform 23 at the front and both sides of the cutout 25, as illustrated in phantom in FIG. 3. The clamp and heater assembly 29, with the clamp frame 31 raised, is then swung by means of the air cylinder 41 from its retracted position of FIGS. 1 and 2 (and shown in solid lines in FIG. 4) to its operative position over the mold shown in FIG. 5 (and shown in phantom in FIG. 4). The clamp frame 31 is then lowered by means of the air cylinder 51 to the position shown in FIGS. 6 and 10 to clamp the assembly of the fabric F and plastic sheet P down against the platform 23 at the front and both sides of the cutout 25 to hold it for being heated by the heater 33, which radiates heat down to the plastic sheet. The heating is continued for a sufficient length of time to soften the plastic sheet. The fabric is also heated to some extent during this operation. The frame 31 is then raised and the clamp and heater assembly 29 is swung back to its retracted position clear of the top of the mold. The clamping head 61 is then swung down (relatively rapidly) by operation of air cylinder 67 to clamp the plastic sheet and fabric assembly down against the top of the mold.

After the plastic sheet and fabric have been clamped down by the clamping head 61 (the clamping being around the margin of the plastic sheet and fabric), vacuum is drawn in the mold 11, with resultant drawing down into the mold cavity 13 of both the plastic sheet and the fabric. The plastic sheet, being air impervious, acts as a barrier to flow of air through the fabric to enable the vacuum-forming of the fabric in the mold cavity. The plastic sheet, having been heated to the point where it has been softened, is enabled to stretch to be drawn down into the mold cavity. The fabric is per se stretchable and thus may be drawn down into the mold cavity without being heated to softening temperature. When the fabric is drawn down into the cavity and contacts the surface of the mold in the cavity, it is rapidly heated by the mold (which is heated by the cartridge heaters 20) up to the forming temperature of the fabric. This occurs in a few seconds.

The vacuum applied to the mold is then slightly reduced to cause the fabric (which is under tension due to having been drawn into the mold) to withdraw slightly (e.g., about ⅛ inch) from the internal surface of the mold. This allows the fabric to cool and keeps the temperature of the plastic (which is in direct contact with the fabric) from rising above the flow temperature of the plastic. If the fabric were not cooled, it would heat the plastic to above the flow temperature of the plastic, and the plastic would then tend to flow through the fabric and rupture and break the vacuum, or penetrate too deeply into the fabric. However, the plastic does penetrate the fabric to some extent in effect to form an interlock between the fabric and the plastic, and this is desirable to prevent the fabric (which is under tension) from slipping on the plastic and losing its shape. Air is turned on to flow through the jets 105 to cool the plastic and cause it to set in its molded shape.

The clamp head 61 is maintained down and vacuum is maintained in the mold 11 for an appropriate interval of time depending on the particular fabric being molded to enable the plastic to attain a set in molded form. Toward the end of this interval, the velocity of air flowing through the jets 105 is increased slightly for more rapid cooling of the plastic sheet to rigidify it in molded form slightly smaller than the cavity. The vacuum in the mold 11 is then cut off.

Figure 12:
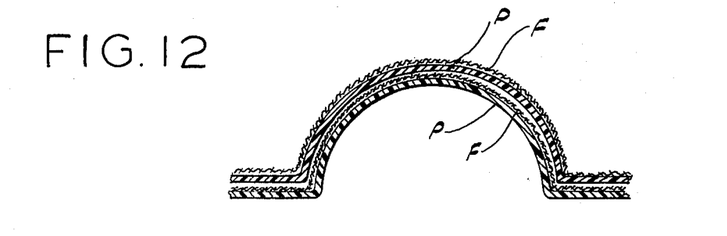
FIG. 12 is a view in section showing how molded fabric-plastic assemblies are stacked.

With vacuum drawn in the suction cups 95, the clamp head 61 is raised. The vacuum cups grip the molded plastic sheet and fabric assembly, and lift it out of the mold. The vacuum is cut off from the pickups and the assembly is removed from the clamp head and stacked with previously formed assemblies as illustrated in FIG. 12. The molded fabric is left in place on the molded plastic for a period of time, e.g., for a minimum of one hour or overnight; it has been found the fabric retains its shape better when this is done. In effect, the plastic sheet is itself utilized as a male mold for the fabric to hold the fabric in its molded shape during the period of its retention on the plastic sheet, and, for reasons which are not apparent, this positive holding of the fabric in its molded shape for a substantial time following the molding operation stabilizes it in its molded shape. Ultimately, the fabric is taken off the plastic, and the latter is salvaged and reprocessed into flat sheet stock for reuse.

As an example of the above, lace fabric made of spandex such as that sold under the trade name LYCRA may be molded to form parts for girdles utilizing a sheet of butyrate or propionate plastic 0.012 inch thick. The lace material and the plastic sheet are applied to the mold with the plastic sheet on the lace, and clamped down by the frame 31. With the heater 33 at a temperature of about 325°F., the plastic sheet is heated for about 15 seconds to heat it to its thermoforming temperature, i.e., to soften it for molding. The lace fabric becomes heated to some extent from the plastic. Then the clamping and heating means 29 is retracted, and the plastic and lace fabric are clamped down on the mold by the head 61. A vacuum of about 10'' of mercury is drawn in the cavity 13 to draw the plastic layer and lace fabric down into the cavity thereby to mold the lace fabric and also the plastic layer to the shape of the cavity. The lace, being stretchable, may be drawn down into the cavity even though it may not be heated to its thermoforming temperature. Once it has been drawn into the cavity, however, it contacts the mold, which may be heated to a temperature of about 375°F., for example. This heats it to its thermoforming temperature in a few seconds. The vacuum is then reduced sufficiently to allow the lace to withdraw slightly from the mold surface. The lace thereupon cools so that it does not heat the plastic sheet above its flow temperature. The slightly reduced vacuum is held on for about 1 to 2 minutes. Shortly after the fabric and plastic have been drawn into the mold, air is blown through the jets 105 against the plastic to cool it. This air cooling is continued and about 5 to 10 seconds before the vacuum is released, the air jet velocity is increased for more rapid cooling of the plastic to rigidify it. Then the air and vacuum are cut off, and the head 61 raised with vacuum drawn in the suction cups 95 to withdraw the lace-plastic assembly from the mold. The lace is generally maintained on the molded plastic at least overnight.

For some fabrics, such as polyester and nylon tricots, it may be desirable to heat the fabric to its thermoformable temperature before it is molded. This may be done by clamping the fabric together with a plastic sheet in a frame with some slack, and heating the plastic to its thermoforming temperature from one side of the frame and heating the fabric to its thermoforming temperature from the other side of the frame by means of two separate heaters. For example, the plastic may be heated to 325°F. and the fabric to 400°F. The differentially heated plastic and fabric are then placed over the mold and molded as above described, except that provision may be made for putting air pressure (e.g., from 5 to 20 psi of air) on top of the plastic.

In view of the above, it will be seen that the several objects of the invention are achieved and other advantageous results attained.

As various changes could be made in the above methods without departing from the scope of the invention, it is intended that all matter contained in the above description or shown in the accompanying drawings shall be interpreted as illustrative and not in a limiting sense.

What is claimed is:

1. The method of forming thermoformable textile fabric into a permanent three-dimensional shape comprising applying a layer of substantially air impervious thermoformable sheet plastic material to one face of the fabric, applying the fabric with the plastic layer thereon to a mold having a cavity conforming to the three-dimensional shape desired with the fabric toward the cavity, heating the plastic layer to thermoforming temperature, applying vacuum to the cavity to draw the plastic layer and the fabric into the cavity thereby to mold the fabric and also said plastic layer to the shape of the cavity, and releasing the vacuum and removing the molded plastic layer with the molded fabric thereon from the mold, and cooling the plastic layer, wherein the mold is heated to heat the fabric to the forming temperature when the fabric is drawn into the cavity and contacts the surface of the mold within the cavity, the vacuum is reduced after the fabric contacts said surface to cause the fabric to withdraw slightly from said surface, the plastic layer is cooled in the cavity while the reduced vacuum is applied to the cavity, the vacuum is then released, and the molded plastic layer and molded fabric are removed together from the mold and the molded fabric retained on the molded plastic layer to hold the molded fabric in its molded shape for a sufficient period of time to stabilize the fabric in its molded shape.

2. The method of claim 1 wherein the plastic layer is cooled in the cavity by flow of air on the plastic layer.

3. The method of claim 2 wherein, just before the vacuum is released, the flow of cooling air is increased.

* * * * *